United States Patent [19]

Deckers et al.

[11] Patent Number: 5,567,785
[45] Date of Patent: Oct. 22, 1996

[54] SUSPENSION POLYMERS BASED ON ACRYLATES AND METHACRYLATES

[75] Inventors: Andreas Deckers, Ludwigshafen; Norbert Guentherberg, Speyer, both of Germany

[73] Assignee: BASF Aktiengesellschaft, Ludwigshafen, Germany

[21] Appl. No.: 107,076

[22] Filed: Aug. 17, 1993

[30] Foreign Application Priority Data

Aug. 22, 1992 [DE] Germany .................. 42 27 869.4

[51] Int. Cl.$^6$ .................... C08F 2/00
[52] U.S. Cl. .............. 526/212; 526/192; 526/210; 526/213; 526/216; 526/328; 526/328.5; 526/329.7
[58] Field of Search .................. 526/212, 216, 526/213, 318.4, 317.1, 210, 211, 192, 328, 318.2, 328.5, 329.7, 345

[56] References Cited

U.S. PATENT DOCUMENTS

| | | | |
|---|---|---|---|
| 3,932,372 | 1/1976 | Lewis et al. | 526/329.7 X |
| 3,978,032 | 8/1976 | Manner | 526/345 X |
| 4,064,092 | 12/1977 | Burroway et al. | 526/216 X |
| 4,246,382 | 1/1981 | Honda et al. | 526/329.7 X |
| 4,737,543 | 4/1988 | Hendricks et al. | 526/216 X |
| 4,772,671 | 9/1988 | Steeman et al. | 526/216 |
| 4,972,036 | 11/1990 | Elmore et al. | 526/216 X |
| 5,300,601 | 4/1994 | Besecke et al. | 526/329.7 X |

OTHER PUBLICATIONS

Houben–Weyl, Methoden der Organischen Chemie, 4th edition, vol. XIV/1, Georg Thieme Verlag, Stuttgart 1961, pp. 406–433.

*Primary Examiner*—Judy M. Reddick
*Attorney, Agent, or Firm*—Keil & Weinkauf

[57] ABSTRACT

Polymers that can be obtained by suspension polymerization of 50 to 100% by weight of at least one compound selected from the group comprising $C_1$-$C_{18}$-alkyl esters of acrylic acid and methacrylic acid, and 0 to 50% by weight of further, free radical-polymerizable monomers in the presence of a buffer selected from the group comprising citric acid, alkali metal citrates, alkaline earth metal citrates and ammonium citrates, and also a process for preparing these polymers and their use in the production of molded articles.

8 Claims, No Drawings

SUSPENSION POLYMERS BASED ON ACRYLATES AND METHACRYLATES

The present invention relates to polymers that can be obtained by suspension polymerization of 50 to 100% by weight of at least one compound selected from the group comprising $C_1$-$C_{18}$-alkyl esters of acrylic acid and methacrylic acid, and 0 to 50% by weight of further, free radical-polymerizable monomers in the presence of a buffer selected from the group comprising citric acid, alkali metal citrates, alkaline earth metal citrates and ammonium citrates.

The invention also relates to a process for preparing these polymers, their use in the production of molded articles, films or fibers, and also molded articles, films or fibers produced from these polymers.

The suspension polymerization of acrylic and methacrylic acid esters and also of monomer mixtures comprised largely of such monomers is known for example from Houben-Weyl, Methoden der Organischen Chemie, 4th edition, Vol. XIV/1, Georg Thieme Verlag, Stuttgart 1961, pages 406 to 433. Since the pH generally falls during the suspension polymerization due to the use of acidic monomers and due to partial saponification of the acrylic or methacrylic esters to the free acid, the reaction mixture, which is generally aqueous, is generally buffered. This measure generally prevents the precipitation of the protective colloid that is preferably used to stabilize the suspension.

For reasons of cost and on account of its extremely good buffering capacity, a phosphate-containing buffer system is generally used, which stabilizes the pH in the range from 6 to 8.

However, phosphate buffers have the disadvantage that, despite the usual purification operations, small amounts of the buffer still remain in the polymer and thus adversely affect the water absorption and the optical properties such as the yellowness index and turbidity, especially in the case of transparent plastics. Polymers having too high a water content generally result in unsatisfactory product properties during subsequent processing, for example by injection molding or extrusion, since voids, streaks or bubbles may for example be formed.

It is an object of the present invention to provide acrylate- or methacrylate-based suspension polymers that have improved optical properties and a lower water absorption than known acrylate- or methacrylate-based suspension polymers.

We have found that this object is achieved by the suspension polymers defined at the beginning.

In addition, a process for preparing these polymers, their use in the production of molded articles, films or fibers, and also molded articles, films or fibers produced from these polymers have also been found.

The polymerization is generally performed in a manner known per se according to the suspension polymerization procedure. For this purpose, the aqueous phase and monomer phase can for example be added first to the reaction vessel with the addition of conventional dispersants, followed by the addition of the initiator. Alternatively however, and preferably in the case of batchwise operation, the aqueous phase already containing the dispersant, buffer and if desired also other additives may be introduced first into the reaction vessel, and the monomer phase, which generally already contains dissolved monomer-soluble additives such as initiators, chain regulators or lubricants, is added, preferably while stirring. The oxygen that is generally present in the polymerization system is expediently removed by evacuation, followed by injection of an inert gas under pressure and subsequent release of the pressure. As a rule the polymerization is started by supplying heat.

As buffer, according to the invention citric acid and its water-soluble salts, preferably alkali metal and alkaline earth metal citrates and also ammonium citrates, are used. The following may be mentioned by way of example: lithium, sodium and potassium dihydrogen citrates, dilithium, disodium, dipotassium, diammonium, magnesium and calcium hydrogen citrates, trilithium, trisodium, tripotassium and triammonium citrates, and trimagnesium and tricalcium dicitrates.

A mixture of citric acid and one of the aforementioned salts is preferably used. A mixture of citric acid and a trialkali metal citrate, in particular trisodium citrate, being preferred.

The amount of buffer is generally in the range from 0.001 to 2% by weight, preferably from 0.001 to 1% by weight, particularly preferably from 0.002 to 0.1% by weight. In the case of a mixture of citric acid and one of its salts, the molar ratio of citrate to citric acid is, depending on the desired pH, generally chosen in the range from 100:1 to 1:1.

Esters of acrylic acid that are used according to the invention are the $C_1$-$C_{18}$-alkyl esters such as methyl, ethyl, n-propyl, i-propyl, n-butyl, i-butyl, sec-butyl, tert-butyl, pentyl, hexyl, heptyl, octyl, 2-ethylhexyl, nonyl, decyl, lauryl or stearyl acrylate, preferably methyl acrylate, n-butyl acrylate and 2-ethylhexyl acrylate, and also mixtures of these monomers.

Esters of methacrylic acid that are used according to the invention are the $C_1$-$C_{18}$-alkyl esters such as methyl, ethyl, n-propyl, i-propyl, n-butyl, i-butyl, sec-butyl, tert-butyl, pentyl, hexyl, heptyl, octyl, 2-ethylhexyl, nonyl, decyl, lauryl or stearyl methacrylate, preferably methyl methacrylate, and also mixtures of these monomers.

The use of methacrylates and acrylates containing hydroxyl, epoxy and amino groups is also possible in the process according to the invention.

The acrylates and methacrylates and also mixtures thereof are used according to the invention in amounts in the range from 50 to 100%, preferably from 80 to 99%, by weight, based on the total amount of monomers.

As further comonomers, there may for example be used the monomers listed below by way of example, in amounts of up to 50% by weight, preferably from 1 to 20% by weight:

aromatic vinyl compounds such as styrene, alpha-methylstyrene, vinyltoluene or p-tert-butyl styrene;

acrylic and methacrylic acid;

acrylamide and methacrylamide;

maleic acid and also its iraides and $C_1$-$C_{10}$-alkyl esters;

fumaric acid and also its imides and $C_1$-$C_{10}$-alkyl esters;

itaconic acid and also its imides and $C_1$-$C_{10}$-alkyl esters;

acrylonitrile and methacrylonitrile.

The monomers are expediently chosen so that the polymer formed has a glass transition temperature of at least 30° C. in order to prevent the polymer beads that are formed from sticking together.

It has been found from previous observations that particularly advantageous polymers comprise 80 to 100% by weight of methyl methacrylate and 0 to 20% by weight of methyl acrylate in a molecular weight range (numerical average, $M_n$) from 20,000 to 300,000 g/mol.

The polymerization is generally performed in the presence of up to 5%, preferably from 0.001 to 1%, particularly preferably from 0.01 to 0.5%, by weight of dispersants, based on the water present in the reaction mixture. Dispersants that may be used include polymers of acrylic and methacrylic acids, or copolymers that are at least 50% derived from these acids and additionally contain up to 50% by weight of monomer units copolymerizable with these acids, such as methyl methacrylate. These polymers may be used as (poly)acid or as alkali metal or ammonium salts, the alkali metal salts being preferred. In particular, according to previous observations suitable polymers comprise 60 to 70% by weight of methacrylic acid and 30 to 40% by weight of methyl methacrylate whose free carboxyl groups are neutralized by sodium hydroxide.

Furthermore, polyvinyl alcohol, polyvinyl-pyrrolidone, pectins, gelatins, methylcellulose or other cellulose ethers may also be used as dispersants.

The dispersants may advantageously be added as 1 to 30% by weight aqueous solutions to the aqueous phase.

As polymerization initiators, which are generally added to the monomer phase, conventional free-radical initiators such as peroxides and azo compounds are generally used, preference being given to those compounds whose decomposition temperatures, ie. temperatures at which half the initiator has decomposed after one hour, are below 150° C. In certain cases it may also be advantageous to use a mixture of different initiators. The amount of initiator used is generally in the range from 0.1 to 5% by weight, based on the total amount of monomers.

Suitable peroxide initiators are for example peroxydicarbonates, peroxyesters, diacyl peroxides, monoperoxycarbonates, perketals and dialkyl peroxides. According to previous observations, particularly suitable initiators are dilauryl peroxide, tert-butyl per-2-ethylhexanoate, tert-butyl per-3,5,5-trimethylhexanoate, 2,2-bis(tert-butylperoxy)butane, 1,1-bis(tert-butyl-peroxy)cyclohexane and dibenzoyl peroxide.

As azo compounds, there may be used azobisisobutyronitrile or azobis(2,4-dimethyl)valeronitrile.

An improvement with regard to a very narrow molecular weight distribution is achieved by the conventional co-use of molecular weight regulators in amounts of up to 10% by weight, preferably from 0.1 to 0.5% by weight. The following may be mentioned as examples of suitable regulators:

mercaptans, such as n-butylmercaptan, n-octylmercaptan, n-dodecylmercaptan or tert-dodecylmercaptan;

thioglycolic esters, such as isooctyl thioglycolate or lauryl thioglycolate;

aliphatic chlorine-containing compounds, enol ethers or dimeric alpha-methylstyrene.

The weight ratio of water to monomer(s) is generally chosen in the range from 4:1 to 1:1, preferably from 2:1 to 1:1.

The polymerization is generally carried out at from 60 to 150, preferably from 80° to 130° C., and at from 100 to 1000, preferably from 500 to 1000 kPa.

Depending on the chosen monomer/water ratio, the polymerization is performed adiabatically or with at least partial dissipation of the heat of polymerization by cooling.

The pH of the reaction mixture is generally chosen in the range from 6 to 8, preferably from 6.5 to 7.5.

Also, customary additives and processing auxiliaries known to the person skilled in the art may be added to the reaction mixture or to the polymer, for example heat stabilizers and UV stabilizers, antioxidants, mold release agents, lubricants, antistatics and colorants.

The polymers may generally be worked up by known methods by precipitation, filtration, decanting or centrifugation followed by drying, for example in a drying oven or in a fluidized bed dryer, the polymer beads being washed, preferably with water, if desired and as necessary.

The dried polymer can be further converted into molded articles by conventional processing methods such as extrusion, calendering or injection molding.

The polymers prepared by the process of the invention have improved optical properties, such as turbidity and yellowness index, and a lower water absorption compared to known polymers based on (meth)acrylates.

EXAMPLES

Examples 1 to 3

A mixture of 1680 g of demineralized water, 13.9 g of the sodium salt of a copolymer prepared from 64% by weight of methacrylic acid and 36% by weight of methyl methacrylate, 7.0 g of trisodium citrate dihydrate, 1400 g of monomer or monomer mixture as given in Table 1, 3.4 g of n-dodecyl mercaptan and 2.6 g of dilauryl peroxide was first rendered inert at room temperature by repeatedly applying a vacuum to the reaction vessel containing the reaction mixture and each time then bringing the reaction system to atmospheric pressure with nitrogen. The reaction mixture was then heated to 80° C. while stirring and left for 6 hours at this temperature. After the reaction product had cooled to room temperature the polymer beads formed were filtered off, washed with about 2 liters of demineralized water and dried at 80° C.

Example 4

The same procedure as in Example 2 was adopted, except that a mixture of 5 g of trisodium citrate dihydrate and 2 g of citric acid was used as buffer instead of trisodiumcitrate.

Comparative Example 1

The same procedure as in Example 2 was adopted, except that 7 g of sodium phosphate hydrate was used as buffer instead of trisodium citrate.

Comparative Example 2

The same procedure as in Example 2 was adopted, except that no buffer was used.

Molded articles were produced from the polymers in a known manner by injection molding and the following material tests were then performed:

the measurement of the turbidity (haze) was performed according to DIN 5036 on roundels 80mm in diameter and 6 mm in height, the yellowing index measurements were performed according to DIN 5036 on roundels 80 mm in diameter and 6 mm in height, and the moisture absorption after 20 days at 60° C. was measured in a manner similar to that described in DIN 53 471 on small standard specimens, the determination of the bead size distribution, expressed as the uniformity coefficient n, was carried out by sieve analysis and plotting a sieve residue curve (according to Rosin-Rammler-Puffe), the determination of the statistical particle diameter d' was performed according to Rosin-Rammler-Puffe (see Ullmann, Enzyklopädie der techn. Chemie, 3rd edition, Vol. 1, 1951, p. 639 ff).

The results of the individual quality tests are shown in the following table.

TABLE

| Example | Buffer | Monomer parts by weight | Turbidity [%] | Yellowing index | $H_2O$ absorption [%] | n | d' [mm] |
|---|---|---|---|---|---|---|---|
| 1 | Na citrate | 100 MMA | 0.5 | 0.3 | 1.1 | 4.9 | 0.53 |
| 2 | Na citrate | 99 MMA 1 MA | 0.5 | 0.3 | 1.2 | 4.9 | 0.50 |
| 3 | Na citrate | 86 MMA 14 MA | 0.6 | 0.3 | 1.5 | 4.8 | 0.48 |
| 4 | Na citrate/ citric acid | 99 MMA 1 MA | 0.3 | 0.3 | 0.9 | 4.9 | 0.52 |
| Comparative Example 1 | phosphate | 99 MMA 1 MA | 0.8 | 0.4 | 2.0 | 3.9 | 0.29 |
| Comparative Example 2 | none | 99 MMA 1 MA | batch coagulates | | | — | — |

The larger the values of n and d', the more favorable is the subsequent processing, for example by decanting, centrifugation, drying or granulation.

We claim:

1. A process for preparing polymers derived from 50 to 100% by weight of at least one monomer selected from the group consisting of $C_1$-$C_{18}$-alkyl esters of acrylic acid and methacrylic acid, and 0 to 50% by weight units of other free radical-polymerizable monomers by suspension polymerization, which process comprises: polymerizing the monomer(s) in the presence of a polymerization initiator and in the presence of a mixture of citric acid and a trialkali metal citrate as a buffer wherein, the polymerization is carried out in the presence of 0.001 to 2% by weight of buffer, based on the water present in the reaction mixture and wherein, the molar ratio of citric acid to citrate is in the range from 1:100 to 1:1.

2. A process as defined in claim 1, wherein the polymerization is carried out in the presence of a peroxide selected from the group consisting of dilauryl peroxide, tert-butyl per-2-ethylhexanoate, ter-butyl per-3,5,5-trimethylhexanoate, 2,2-bis(ter-butylperoxy)butane, 1,1-bis(ter-butylperoxy)cyclohexanone and dibenzoyl peroxide.

3. A process as defined in claim 1, wherein the polymerization is carried out in the presence of an azo compound selected from the group consisting of azobisisobutyronitrile and azobis(2,4-dimethyl)valeronitrile.

4. A process as defined in claim 1, wherein the buffer is a mixture of citric acid and trisodium citrate.

5. A process as defined in claim 1, wherein the polymerization is carried out at from 100 to 1000 kPa.

6. A process as defined in claim 1, wherein the polymerization is carried out at from 80° to 130° C.

7. A process as defined in claim 1, wherein the polymerization is carried out in the presence of a molecular weight regulator.

8. Molded articles, films or fibers produced from a polymer formed by the process of claim 1.

* * * * *

UNITED STATES PATENT AND TRADEMARK OFFICE
CERTIFICATE OF CORRECTION

PATENT NO. : 5,567,785
DATED : October 22, 1996
INVENTOR(S) : DECKERS et al.

It is certified that error appears in the above-indentified patent and that said Letters Patent is hereby corrected as shown below:

Column 6, claim 8, line 38, "produced" should be --formed--.

Column 6, claim 8, line 39, "formed" should be --produced--.

Signed and Sealed this

Twenty-fourth Day of December, 1996

Attest:

BRUCE LEHMAN

Attesting Officer      Commissioner of Patents and Trademarks